United States Patent
Libin

(10) Patent No.: US 11,093,306 B1
(45) Date of Patent: Aug. 17, 2021

(54) AUTOMATIC PRIORITIZATION AND DELIVERY OF AUDIO-VISUAL NOTIFICATIONS OPTIMIZED FOR USER WORKFLOW

(71) Applicant: All Turtles Corporation, San Francisco, CA (US)

(72) Inventor: Phil Libin, San Francisco, CA (US)

(73) Assignee: All Turtles Corporation, San Francisco, CA (US)

( * ) Notice: Subject to any disclaimer, the term of this patent is extended or adjusted under 35 U.S.C. 154(b) by 0 days.

(21) Appl. No.: 16/816,991

(22) Filed: Mar. 12, 2020

Related U.S. Application Data

(60) Provisional application No. 62/818,134, filed on Mar. 14, 2019.

(51) Int. Cl.
    *G06F 9/54* (2006.01)
    *H04L 29/08* (2006.01)

(52) U.S. Cl.
    CPC .............. *G06F 9/542* (2013.01); *G06F 9/546* (2013.01); *H04L 67/24* (2013.01)

(58) Field of Classification Search
    None
    See application file for complete search history.

(56) References Cited

U.S. PATENT DOCUMENTS

| | | | |
|---|---|---|---|
| 10,200,237 B1* | 2/2019 | Gupta | |
| 2005/0198265 A1* | 9/2005 | Veprek | |
| 2010/0180001 A1* | 6/2010 | Hardt | |
| 2018/0077097 A1* | 3/2018 | Alfaro | |

* cited by examiner

*Primary Examiner* — Syed A Roni
(74) *Attorney, Agent, or Firm* — Muirhead and Saturnelli, LLC

(57) ABSTRACT

Managing push notifications for a user includes buffering a plurality of notifications, sorting the notifications based on relevance of the notifications to the user and workflow of the user, and delivering the notifications to the user in an order corresponding to sorting the notifications. Sorting may include classifying the notifications into categories that include user notifications, transactional notifications, promotional notifications, and system notifications. Sorting may include associating each of the notifications with aspects of the workflow of the user. Sorting may include scoring notifications according to notification relevance factors and prioritizing the notifications according to an aggregate relevance score of each of the notifications. The notification relevance factors may depend on notification properties, activities of the user, user settings, a physiological and emotional state of the user, and/or user interaction with content. The notification properties may include expiring, non-expiring, recurrence, non-recurrence, audio delivery format, and/or visual delivery format.

25 Claims, 6 Drawing Sheets

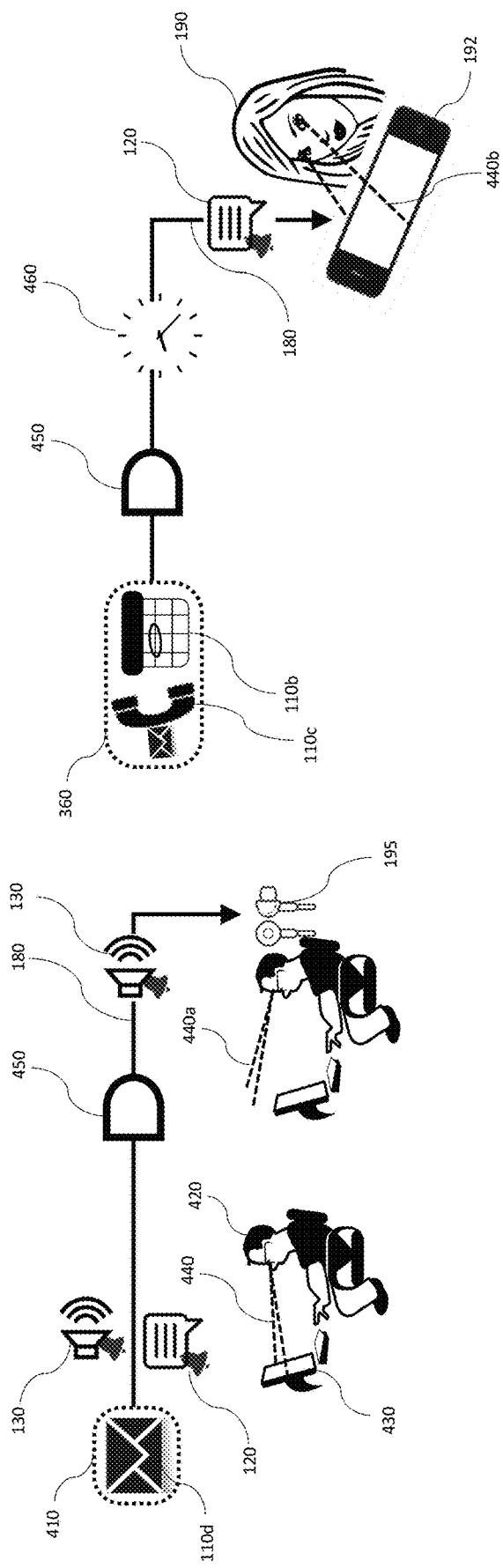

AUTOMATIC PRIORITIZATION AND DELIVERY OF AUDIO-VISUAL NOTIFICATIONS OPTIMIZED FOR USER WORKFLOW

CROSS-REFERENCE TO RELATED APPLICATIONS

This application claims priority to U.S. Prov. App. No. 62/818,134, filed on Mar. 14, 2019, and entitled "AUTOMATIC PRIORITIZATION AND DELIVERY OF AUDIO-VISUAL NOTIFICATIONS OPTIMIZED FOR USER WORKFLOW", which is incorporated herein by reference.

TECHNICAL FIELD

This application is directed to the field of information processing and workflow analysis, and more specifically to workflow aware prioritization and delivery of audio-visual notifications for a set of mobile, web or desktop user applications.

BACKGROUND OF THE INVENTION

Mobile, web and desktop push notifications delivered to users from applications and services have become a core feature of modern information exchange. Started as calendar reminders and first email notifications on Blackberry smartphones by Blackberry Limited (former Research in Motion) in early 2000's and introduced by Apple Inc. as an Apple Push Notification Service (APNs) feature of its iOS mobile platform, notifications are supported by every major mobile operating system, web browser and service and are constantly enhanced by new capabilities, such as images, emoji, interactive buttons for instant user responses, other opt-in and customization mechanisms for users, reporting features for application publishers, etc.

One broadly accepted categorization distinguishes between four types of push notifications based on their content: (1) transactional notifications associated with events or specific time periods, such as a shipment delivery notification for a purchased product, a scoring update for an ongoing sports event or a notification about a news item available for user consumption in a subscribed news service; (2) promotional notifications, directly or indirectly inviting a user to engage in a new activity, such as sales offers, invitations to join new services or activities, restoring an abandoned e-commerce connection, etc.; (3) user lifestyle or communications related notifications, for example, new and unread emails or friend activities in social applications, reminders to take a medicine, go to a party, concert or other event, etc.; and (4) system notifications, including new application features, services and operating systems, applications updates, or permission notifications that allow users to authorize receiving notifications from specific apps. Additionally, notifications may be location and user behavior aware, may differ by replay methods, time sensitivity, recurrence and many other parameters.

According to industry statistics, an average U.S. smartphone user receives over 45 push notifications per day, which amounts to over 3.6 trillion push notifications arriving annually. Opt-in rates for many important types of notifications are very high: for each of the top three notification items: missed call, text message, and email, over 80% of U.S. smartphone users allow some kind of alert in each category, while an average push opt-in rate in 2018 has been determined to be 53.3% by some studies and 67%, by others.

Notwithstanding the quick establishment and popularity of mobile and other push notifications as an important component of the contemporary digital lifestyle, user adoption of the notification culture faces significant challenges. It has been reported that over 50% of mobile users feel distracted by push notification. According to market studies, in 2015, an application, pushing on average ten notifications per week, caused 75% of consumers to disable notifications, while 63% of consumers would abandon the application altogether, unless the application was an important relationship-based or other necessary application.

Publishers and platform providers have done significant work to increase market acceptance of mobile push notifications by increasing the relevance of push notifications. Thus, in 2018, the ratio of personalized and segmented notifications adapted to user profiles, demographics and personal settings, compared to broadcast notifications, reached 85:15, which is a change from the 65:35 ratio in 2015. Still, notification adoption problems largely persist, causing platform vendors to step in with new user-controlled capabilities to disrupt notification streams, such as Instant Tuning provided in iOS 12.

Accordingly, it would be useful to provide mechanisms for automatic analysis, prioritization and delivery of audio-visual push notifications generated by mobile, web and desktop applications, services and platforms, optimized for user workflow and mitigating disruptions of the workflow.

SUMMARY OF THE INVENTION

According to the system described herein, managing push notifications for a user includes buffering a plurality of notifications, sorting the notifications based on relevance of the notifications to the user and workflow of the user, and delivering the notifications to the user in an order corresponding to sorting the notifications. Buffering the notifications may include placing the notifications in a queue and the notifications may be sorted in the queue and are delivered from the queue following sorting. Sorting may include classifying the notifications into categories that include user notifications, transactional notifications, promotional notifications, and system notifications. Sorting may include associating each of the notifications with aspects of the workflow of the user. Sorting may include scoring notifications according to notification relevance factors and prioritizing the notifications according to an aggregate relevance score of each of the notifications. The notification relevance factors may depend on notification properties, activities of the user, user settings, a physiological and emotional state of the user, and/or user interaction with content. The notification properties may include expiring, non-expiring, recurrence, non-recurrence, audio delivery format, and/or visual delivery format. The visual delivery format may include plain text, images, emojis, interactive buttons, special effects, and/or display properties. The activities of the user may include desktop work, a meeting and/or a phone talk. The user settings may include settings for generation of notification previews and/or visibility of notifications on a lock screen of a user. User interaction with content may include visual interaction, voice interaction, touch interaction, gesture interaction, writing on paper, tablet or whiteboard, and/or eye-tracking. Managing push notifications for a user may include grouping notifications according to relevance. Notifications that are grouped together may all be delivered when at least one of the notifications that is grouped reaches a critical time. Delivering the notifications may include determining an opportune time. A notification that has reached a critical time may be delivered independent of whether an opportune time has been reached. The opportune time may depend on sorting positions of the notifications, time sensitivity of the notifications, the workflow of the user, activities of the user and/or an emotional state of the user. The emotional state of the user may be determined by wearable sensors. The opportune time may include a time when the user looks away from a screen and/or a time when participants of a meeting that include the user stop talking. The notifications may be delivered through an audio device when the user looks away from the screen and the notifications may be delivered through an audio device and/or a visual device when participants of the meeting stop talking. Sorting may include using cues to determine notifications to be sent to the user. The cues may include text of one of the notifications corresponding to text in the workflow of the user, one of the notifications being about an upcoming meeting that the user plans to attend, and/or one of the notifications being about a person that is currently engaging with the user. The notifications may be from applications that include a news application, a calendar application, a voicemail application, an email application, and/or a social application. The social application may be a Slack application, a Facebook application, or a Skype application. At least one of the notifications may be delivered to the user and to other users at the same time.

According further to the system described herein, a non-transitory computer readable medium contains software that manages push notifications for a user. The software includes executable code that buffers a plurality of notifications, executable code that sorts the notifications based on relevance of the notifications to the user and workflow of the user, and executable code that delivers the notifications to the user in an order corresponding to sorting the notifications. Buffering the notifications may include placing the notifications in a queue and the notifications may be sorted in the queue and are delivered from the queue following sorting. Sorting may include classifying the notifications into categories that include user notifications, transactional notifications, promotional notifications, and system notifications. Sorting may include associating each of the notifications with aspects of the workflow of the user. Sorting may include scoring notifications according to notification relevance factors and prioritizing the notifications according to an aggregate relevance score of each of the notifications. The notification relevance factors may depend on notification properties, activities of the user, user settings, a physiological and emotional state of the user, and/or user interaction with content. The notification properties may include expiring, non-expiring, recurrence, non-recurrence, audio delivery format, and/or visual delivery format. The visual delivery format may include plain text, images, emojis, interactive buttons, special effects, and/or display properties. The activities of the user may include desktop work, a meeting and/or a phone talk. The user settings may include settings for generation of notification previews and/or visibility of notifications on a lock screen of a user. User interaction with content may include visual interaction, voice interaction, touch interaction, gesture interaction, writing on paper, tablet or whiteboard, and/or eye-tracking. The software may include executable code that groups notifications according to relevance. Notifications that are grouped together may all be delivered when at least one of the notifications that is grouped reaches a critical time. Delivering the notifications may include determining an opportune time. A notification that has reached a critical time may be delivered independent of whether an opportune time has been reached. The opportune time may depend on sorting positions of the notifications, time sensitivity of the notifications, the workflow of the user, activities of the user and/or an emotional state of the user. The emotional state of the user may be determined by wearable sensors. The opportune time may include a time when the user looks away from a screen and/or a time when participants of a meeting that include the user stop talking. The notifications may be delivered through an audio device when the user looks away from the screen and the notifications may be delivered through an audio device and/or a visual device when participants of the meeting stop talking. Sorting may include using cues to determine notifications to be sent to the user. The cues may include text of one of the notifications corresponding to text in the workflow of the user, one of the notifications being about an upcoming meeting that the user plans to attend, and/or one of the notifications being about a person that is currently engaging with the user. The notifications may be from applications that include a news application, a calendar application, a voicemail application, an email application, and/or a social application. The social application may be a Slack application, a Facebook application, or a Skype application. At least one of the notifications may be delivered to the user and to other users at the same time.

The proposed system receives and queues push notifications initiated by applications, services or push distribution platforms, assesses the relevance of the notifications, and prioritizes notifications, monitors user workflow, determines optimal timing and preferred formats for delivery of the notifications, and delivers the notifications. Push notifications are notifications that are provided directly to a user from specific software (e.g., a specific application) irrespective of whether the specific software is running in the foreground of a receiving device of a user. In some cases, the specific software may not be running at all on the receiving device but, instead, the push notification comes from a built-in mechanism of an OS or from different software. The push notification may be audible or may be visual, where the notification appears as a message on a screen of the receiving device (e.g., a screen of a smartphone, desktop, laptop, tablet, etc.).

System functioning includes the following steps:
1. Receiving and queuing (buffering) push notifications so that the push notifications are not provided to the user.
2. Assessing relevance of each notification in the context of user activities and workflow.
3. Prioritizing, reordering and grouping notifications in the queue based on relevance of the notifications, potentially redefining a desired delivery sequence of the notifications, deferring or deleting some of the notifications from the queue.
4. Optimizing delivery schedule and preferred delivery format for each prioritized notification and monitoring user activities to deliver each notification at a best possible time.
5. Delivering the notifications to the user based on prioritizing and optimizing.

Various aspects of system functioning are explained as follows.
A. Push notifications at the Step 1 (above) may arrive from a broad range of mobile, web and desktop applications and services and from dedicated notification distribution platforms, services and applications:
   User notifications may include notifications and alerts from email and social applications and services (Facebook, Twitter, Slack, Microsoft Teams, Skype, etc.);

Transactional notifications may offer various updates from previously made e-commerce transactions (Amazon and other online stores), subscriptions (live scores, news, events, etc.) and other user-initiated actions;

Promotional notifications may offer various engagement and re-engagement actions, for example, smart marketing notifications from stores, reminders about abandoned shopping carts in installed applications, discounts at local stores, promotional Uber rates, etc.;

System notifications may announce new application and platform features and application and operating system upgrades and may invite users to set up notification permissions and rules for newly installed applications and for new service subscriptions.

Various categories and application specific notifications may have substantially different properties, as further explained below. For example, transactional notifications and some user notifications may be time sensitive (e.g. product delivery to customer entry door or a short notice about meeting cancelation), whereas system notifications about a feature upgrade for a rarely used application may often be ignored altogether. Some notifications may, by the nature of the notifications, be one-time alerts (or may be reduced by the user to a non-repetitive functioning, as often prompted by a "Don't show this notification again" option), while other notifications may be inherently and/or factually recurrent.

B. In order to assess relevance of arriving notifications to user activities and workflow at Step 2 (above), the system may use several types of factors to determine notification relevance, as follows:
   (i) Notification properties, such as expiring/non-expiring, one-time/recurrent, time sensitivity (in various time units), notification formats, including various combinations of visual, audio and combined formats, visual notifications with plain text, images, emojis, interactive buttons, special effects, such as lighting, shadows and three-dimensional effects, display properties, such as fading or present until user action, etc.
   (ii) User settings for various notification categories and specific applications. User ability to control push notifications is a developing feature set of operating systems, especially iOS with its Notification Center and Instant Tuning. For example, users may control message previews, an appearance of messages on a lock screen and an ability to view, respond or delete previews of messages from the lock screen.
   (iii) User workflow as a sequence of activities. This includes individual and collective work on various projects, including in-person and remote (virtual) meetings with various degree of participation, phone talks, document creation and editing, lunch and recreational breaks.
   (iv) User equipment, content and user interaction with the content. This includes content created and/or consumed by the user for each activity: text, audio, video, different display methods, typing, voice entry, recording or talking, touch navigation and manipulations, gesture navigation captured by special devices, writing on paper, whiteboard or tablet, eye tracking, etc.
   (v) User emotional state and attention span. With the proliferation of wearable devices, a physiological and emotional state of the user becomes increasingly identifiable through vital signs (heart rate, blood pressure), muscular activity and biochemical parameters constantly monitored by wearable sensors. Accordingly, stress, relaxation and perceptiveness periods may be identified and used as a notification prioritization factor.

C. Assessing notification relevance in the context of user activities and workflow may rely upon the following techniques:
   (a) Associating each incoming notification in the queue with various aspects of the workflow.
   (b) Scoring notifications according to notification relevance factors explained elsewhere herein.
   (c) Prioritizing (ordering) notifications in the queue according to a cumulative relevance score of each of the notifications.
   (d) Identifying and building natural groupings of notifications by type, content and other grouping factors.

Below are several examples illustrating notification relevance assessment, prioritizing and grouping notifications:

A voicemail notification may inform a user that a meeting member cannot make a meeting upcoming in thirty minutes. Voice recognition may decipher the content of the voicemail and the system may associate the content with a calendar of the user where the meeting is present and a ten-minute meeting reminder has been just added to the notification queue. This makes a voicemail notification a priority item with a high workflow relevance score, which may be grouped with the meeting reminder and placed at a top priority spot.

A user is looking at a smartphone screen where a certain text is present. At the same time, an email reminder and a Slack message reminder appear in the queue, indicating an incoming email and a Slack post, both containing a representative portion of the text on the user screen. This content association may cause both reminders to be assigned significant content scores and may prompt the system to group the email and Slack notifications and place the email and Slack notifications ahead of less relevant notifications in the queue (based on a cumulative relevance score of the email and Slack notifications).

A user is having a phone conversation with a person identified by the system. Within a couple minutes of the talk, a Facebook notification of a new post by the person arrives into a notification queue of the user. The system may assign a workflow relevance score (and, by deciphering the conversation using voice recognition technologies, potentially associate the content of the conversation with the text of the post and add a content relevance score to the post). The system may prioritize the Facebook notification in the queue compared, for instance, with other Facebook notifications found in the queue.

D. Optimizing delivery schedule and preferred delivery format for the prioritized and grouped notifications in the updated queue may include various delivery scenarios:
   a. Depending on notification properties, the system may delay a notification delivery, looking for a most opportune moment to convey a notification, with due respect to a position in the prioritized queue and time sensitivity of the notification. For example, a time sensitive notification may be delivered at a first opportune time or close to an expiration of a critical time period for delivery (delivery due to time constraints).
   b. In search for optimal message delays, opportune moments and optimal delivery formats, the system constantly monitors user workflow, activities and emotional state and may correlate opportune moments with openings (micro-breaks) in the workflow. For example, if a user utilizes an eye-tracking technology, the system may follow user gaze direction and detect an opportune moment to deliver a priority notification in a voice format when the user looks away from the screen for a few seconds. Conversely, the system may follow a meeting flow where talk segments by different participants, including a user, are following each other and identify pauses in the talk to deliver visual notifications on the user screen.

c. The system may simultaneously manage notifications for multiple users, identify similar notifications targeting a group of users and optionally broadcast notifications to the groups. For example, if each participant of a current meeting is notified that a next meeting, which includes all participants of the current meeting and some additional participants, is cancelled or delayed, the system may use a detected pause in the conversation at the current meeting to broadcast the notification using an audio-visual equipment of the conference room(s) where the current meeting is conducted.

BRIEF DESCRIPTION OF THE DRAWINGS

Embodiments of the system described herein will now be explained in more detail in accordance with the figures of the drawings, which are briefly described as follows.

FIGS. 4A-4C are schematic illustrations of notification delivery scenarios, according to an embodiment of the system described herein.

DETAILED DESCRIPTION OF VARIOUS EMBODIMENTS

The system described herein provides a mechanism for receiving, queueing, prioritizing and delivery of push notifications initiated by applications, services or push distribution platforms based on workflow analysis, assessment of notification relevance and optimal timing, and preferred formats for notification delivery.

Figure 1:
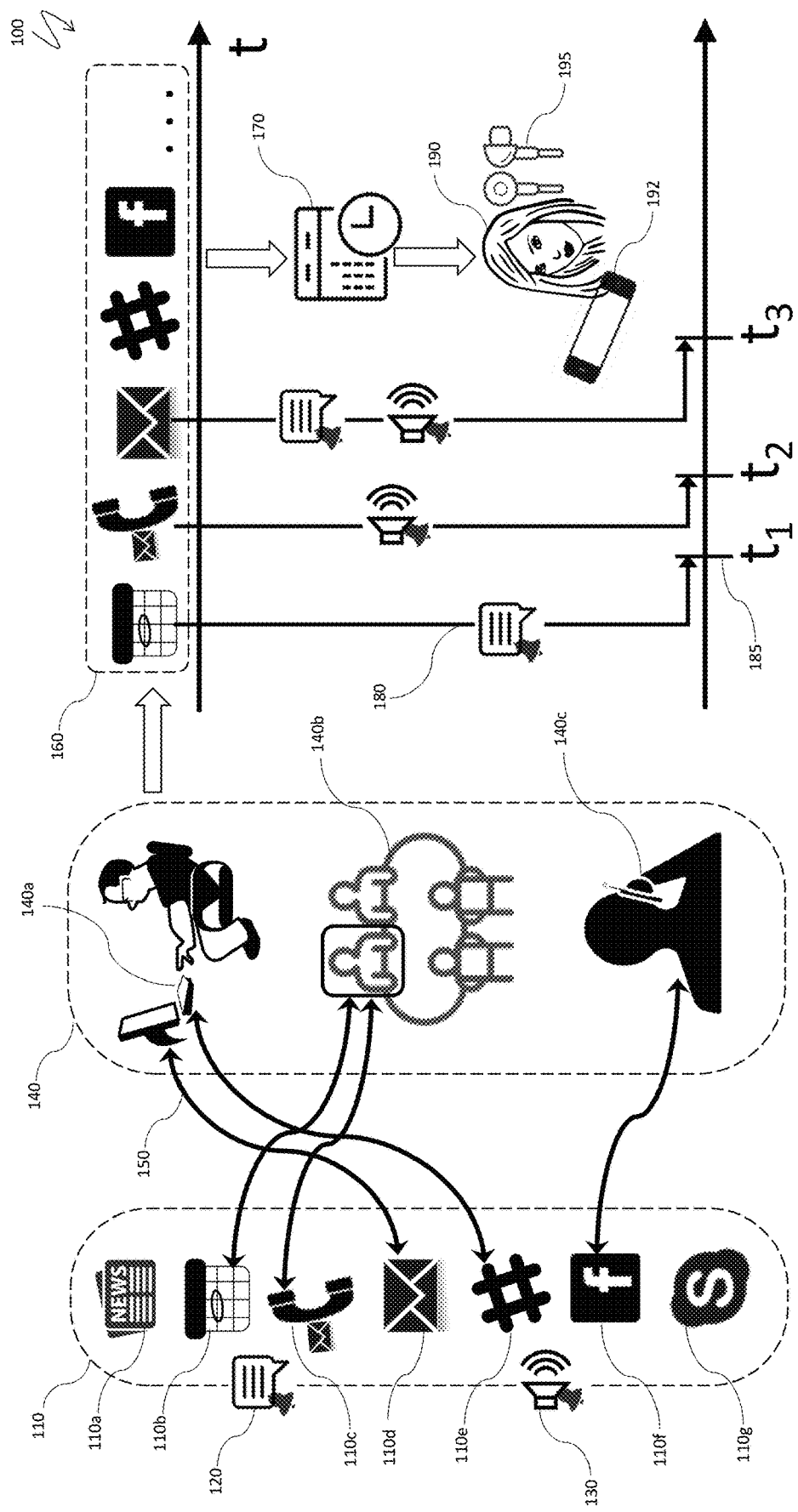
FIG. 1 is a schematic illustration of a system for prioritization and delivery of notifications, according to an embodiment of the system described herein.

FIG. 1 is a schematic illustration 100 of prioritization and delivery of notifications. A set of user applications 110 capable of push notifications is exemplified by a news application 110a, a calendar (scheduling) application 110b, a voicemail application 110c, an email application 110d, and by three messaging and social applications: a Slack application 110e, a Facebook application 110f and a Skype application 110g. Push notifications, generated by the applications 110 or a platform for hosting the applications, are shown on a periphery of the applications 110 and may be delivered in a visual format 120 or an audio format 130.

Notification delivery conditions and options may be defined by user activities 140; in FIG. 1, three user activities are shown: user works on a desktop computer 140a, several users are engaged in a meeting 140b, and user conducts a phone talk 140c. Examples of applications ready to send notifications to users engaged in each of the activities 140a-140c include: the email application 110d and the Slack application 110e for the activity 140a; the calendar application 110b and the voicemail application 110c for one of the users participating in the meeting 140b, and the Facebook application 110f for the phone talk 140c.

The system may analyze user workflow associated with each or some of the activities 140a-140c and may assess relevance of pending notifications to a corresponding workflow, as shown by curved arrows 150. Based on a relevance assessment, the system may create and process a queue 160 of prioritized notifications, which may be subsequently processed by a scheduler-optimizer system component 170, which determines delivery times 185 when the notifications are sent out in visual or audio formats (or both), as illustrated by arrows 180 with notification format icons, to a user 190; the user may have a visual mechanism 192 (e.g., smartphone) and audio capabilities 195 (e.g., earbuds) to receive notifications with minimal interruptions to work of the user 190 and possibly other users.

Figure 2:
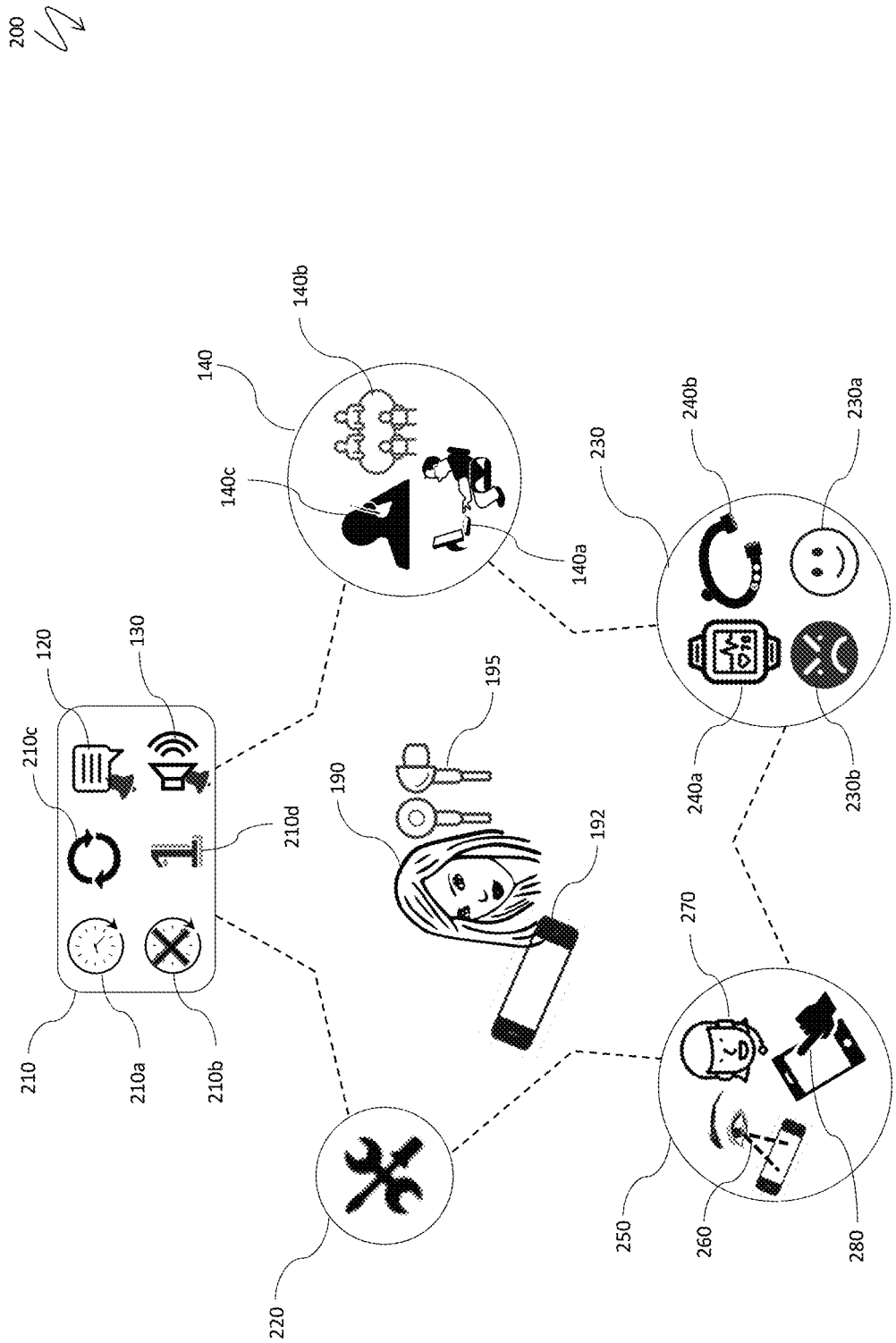
FIG. 2 is a schematic illustration of relevance factors for prioritization and delivery of notifications, according to an embodiment of the system described herein.

FIG. 2 is a schematic illustration 200 of relevance factors employed for prioritization and delivery of notifications. In order to continuously prioritize and determine optimal delivery times for notifications to the user 190 with the visual mechanism 192 and audio capability 195, the system may use at least five groups of relevance factors:

1. Notification properties 210, such as expiring notifications 210a and non-expiring notifications 210b; recurrent notifications 210c and one-time notifications 210d, the audio delivery format 130 for notifications and the visual format 120 for notifications (see FIG. 1 for details).
2. Specifics of the user activities 140, represented by the desktop work 140a, the meeting 140b and the phone talk 140c (explained elsewhere herein, including FIG. 1 and accompanying text).
3. User settings 220, explained elsewhere herein (for example, generation of notification previews and their visibility on a lock screen of user's mobile device).
4. A physiological and emotional state 230 of the user, such as positive emotions 230a and negative emotions 230b that may be captured by wearable devices—smart watches 240a and smart wristbands 240b.
5. User interaction with content 250, including visual interaction (such as gaze direction) 260, voice interaction 270 and touch interaction 280.

Figure 3:
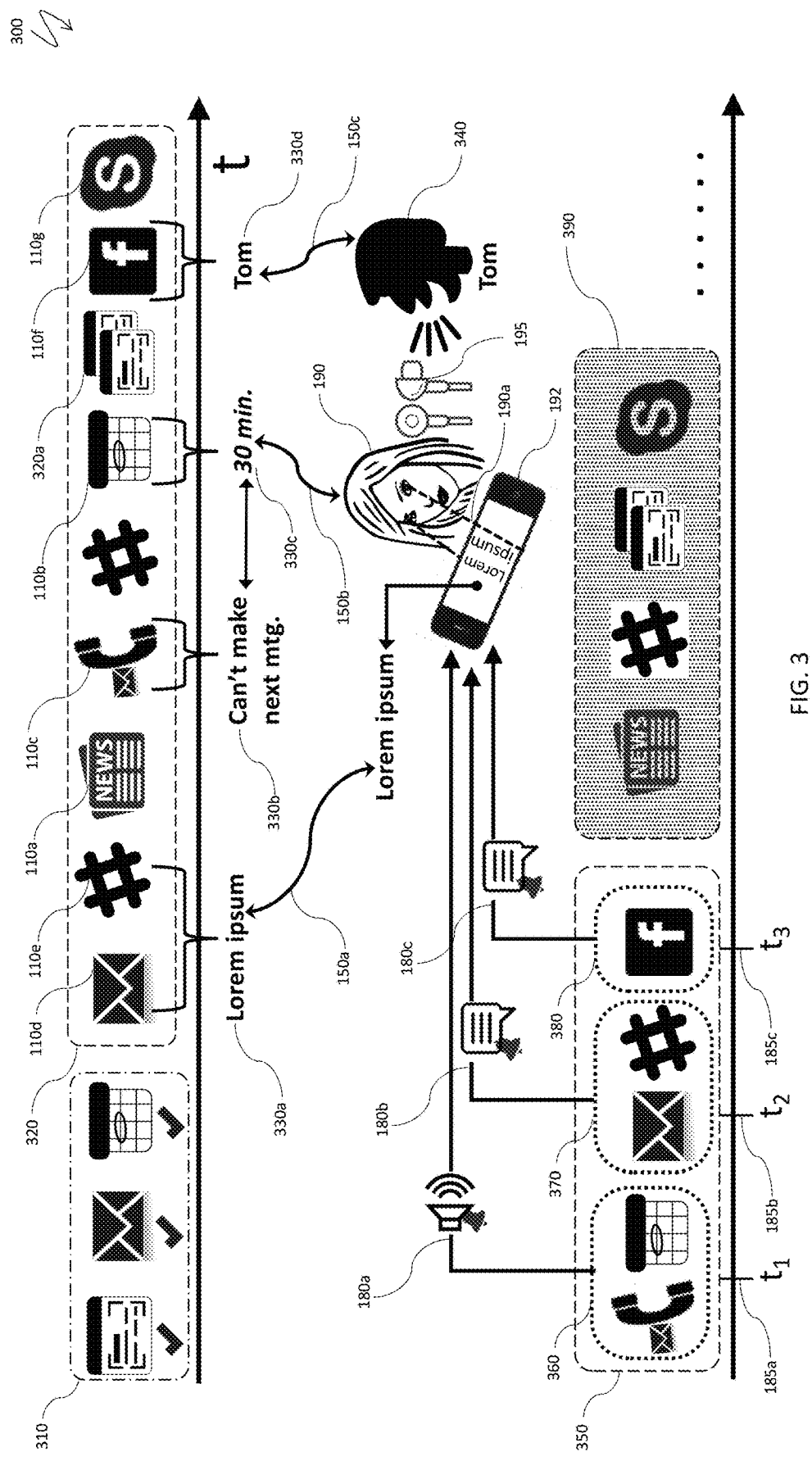
FIG. 3 is a schematic illustration of a prioritization process for notifications, according to an embodiment of the system described herein.

FIG. 3 is a schematic illustration 300 of a prioritization process for notifications. Previously delivered notifications 310 form an archive pool 310, while a notification queue 320 includes pending notifications for various applications: the email application 110d, the Slack application 110e, the news article 110a, the voicemail application 110c, the calendar 110b, a web service 320a, the Facebook application 110f and the Skype application 110g, initially ordered by notification generation timestamps.

The system analyzes user workflow, extracts contextual, conversational, time-related and other cues, and associates captured cues across user activities, application content and other characteristics. Subsequently, the system utilizes the associations to assess notification relevance, as shown by the arrows 150a, 150b, 150c (see also FIG. 1 and the accompanying text), and determines relevance scores and notification delivery priorities. FIG. 3 shows four cues 330a, 330b, 330c, 330d:

The cue 330a in FIG. 3 is a text cue "Lorem ipsum", which is present in both messages for an email received by the email application 110*d* and a post (or direct message) for the Slack application 110*e*, as shown by a figure bracket connecting the applications 110*d*, 110*e* with the cue. The corresponding notifications have been generated by the applications 110*d*, 110*e* to alert the user 190 about the email and the Slack post/message. Simultaneously processing the workflow of the user 190, the system discovers that a same text cue "Lorem ipsum" is present on the screen of the smartphone 192 of the user 190. Moreover, the user 190 is looking at the text cue on the screen of the smartphone 192, as shown by a gaze direction 190*a*, which may be captured by an eye-tracking system on the smartphone 192. Accordingly, the system may use a relevance assessment component, indicated by the arrow 150*a*, to elevate a relevance score of notifications from the email application 110*d* and the Slack application 110*e* and prioritize delivery of the notifications.

The cue 330*b* is a voice-to-text conversion of a voicemail message to the user 190, captured by the voicemail application 110*c*, about unavailability for a next meeting of a participant of the next meeting. After parsing and interpreting a text message corresponding to the cue 330*b* and comparing the text message to the cue 330*c*—a meeting countdown and a pending notification by the calendar application 110*b*, a system relevance assessment module, indicated by the arrow 150*b*, may decide about an urgency of the voicemail message and boost a notification delivery priority for the voicemail application 110*c*.

The cue 330*d* is a personal name of an author of a Facebook post (or a name present in the post). By analyzing user workflow at the time when a notification about the post has been generated by the Facebook application 110*f* (or shortly after that), a system relevance assessment module, indicated by the arrow 150*c*, realizes that the user 190 is engaged in a conversation with a person 340, whose name is the same as the personal name of the author of the Facebook post (or the name present in the post). The association may elevate a relevance score and increase priority of delivery of a corresponding notification.

Based on relevance scores and priority assessments, the scheduler-optimizer system component (not shown in FIG. 3, see item 170 in FIG. 1) may build a prioritized and grouped notification pool 350 with a delivery schedule, as follows:

A first priority notification group 360 with notifications from the voicemail application 110*c* and the calendar application 110*b*, delivered as an audio notification 180*a* (for example, "You have an urgent voicemail") at a time 185*a*.

A second priority notification group 370 with notifications from the email application 110*d* and the Slack application 110*e*, delivered as a text notification 180*b* at a time 185*b*.

A third priority notification group 380, including a single Facebook notification, delivered as a text notification 180*c* at a time 185*c*.

The remaining notifications, initially present in the notification queue 320, may be temporarily placed into a deferred notification pool 390, subject to further processing.

Figure 4C:
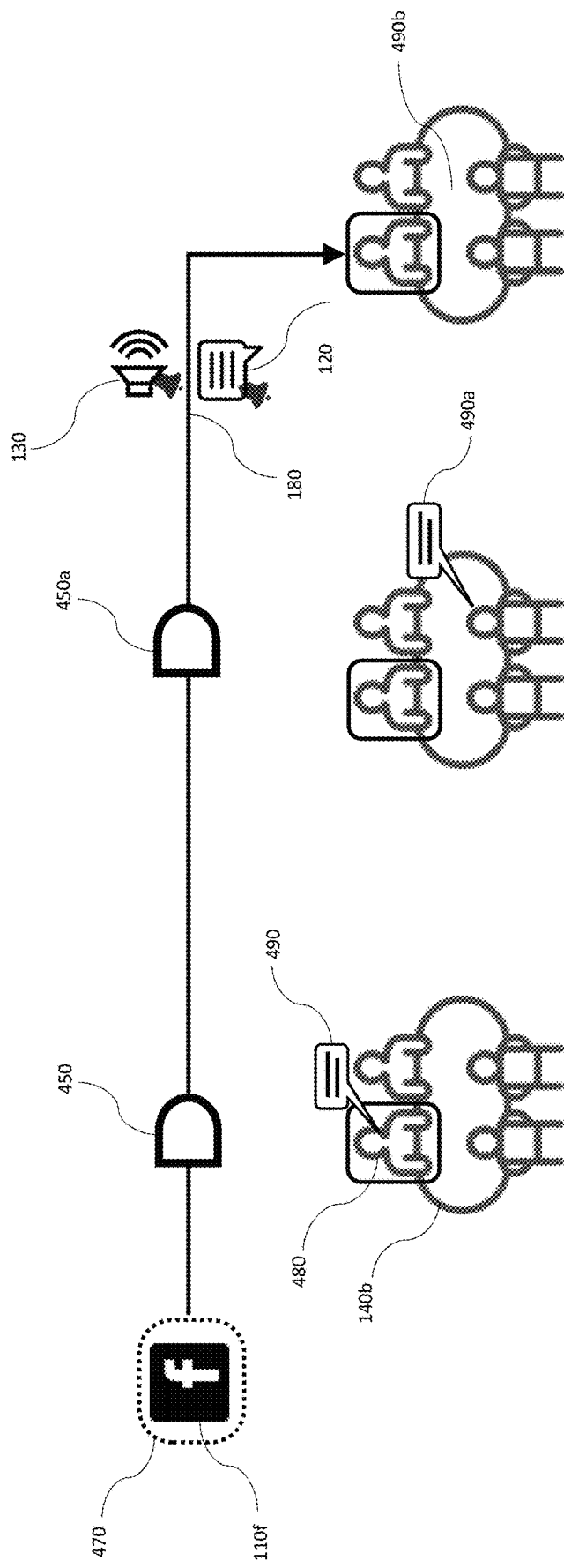

FIGS. 4A-4C are schematic illustrations of notification delivery scenarios.

FIG. 4A schematically illustrates notification delivery on change of gaze direction and attention span. A fragment 410 of a prioritized notification pool, explained in conjunction with FIG. 3, includes a pending notification from the email application 110*d* generated for a user 420 working on a desktop computer. Both the audio delivery format 130 and the visual delivery format 120 are available for the pending notification but initially, both the format and the delivery time are undecided, because the user looks at the screen, as shown by a gaze direction 440, and workflow of the user does not invite an email notification because an instant notification delivery may distract from current tasks of the user 420. Accordingly, the system delays notification delivery, as shown by an item 450. Subsequently, the user 420 looks off the screen, changing to a gaze direction 440*a*. Once the gaze direction 440*a* is identified by the system using eye-tracking hardware and software, the system may use an opportune moment to deliver the notification. The system finds an active audio listening device 192, such as earbuds, and a notification delivery is made, as indicated by the arrow 180, in the audio format 130 as a most non-intrusive delivery method under existing conditions.

FIG. 4B is a schematic illustration of notification delivery due to time constraints based on the priority notification group 360, introduced and explained in conjunction with FIG. 3. The group 360 includes the voicemail application 110*c* and the calendar application 110*b*. Under assumptions described in connection with FIG. 3, the voicemail informs the user 190 that a participant of an upcoming meeting scheduled on a calendar of the user 190 cannot be present at the upcoming meeting. Initially, a notification about that voicemail may be delayed, as shown by the item 450, due to a conflict with workflow of the user 190. However, upon reaching a critical countdown 460 to the meeting, the notification becomes urgent and has to be delivered in spite of relevance of the notification to the current workflow of the user 190. Accordingly, the system detects that the user is looking on the screen of the smartphone 192, as shown by a gaze direction 440*b*, so the system elects to deliver the notification (such as "You have an urgent voicemail", see FIG. 3 for details) in the text format 120, as shown by the arrow 180 so that the text is displayed on the screen of the smartphone 192.

FIG. 4C is a schematic illustration of notification delivery during a meeting pause. A fragment 470 of a prioritized notification pool includes a pending notification from the Facebook application 110*d* generated for a user 480, currently participating in the meeting 140*b* (see FIG. 1 and the accompanying text for description and notations of user activities). The system does not deliver the notification immediately, since the user 480 is talking to other meeting participants, as indicated by the item 490; accordingly, the first delay 450 is applied by the system. In a next episode of the meeting 140*b* shown in FIG. 4C, the system still does not deliver the notification to the user 480, since another meeting participant is talking, as indicated by an item 490*a*; this causes another instance of the delay 450*a*. Finally, there is a pause 490*b* in the meeting flow when no participants are talking. The system uses the pause as an opportune moment to deliver the notification, as shown by the arrow 180, in both the visual format 120 and the audio format 130 (in an assumption that the user has an active listening device that allows listening to the notification without distracting other participants of the meeting).

Figure 5:
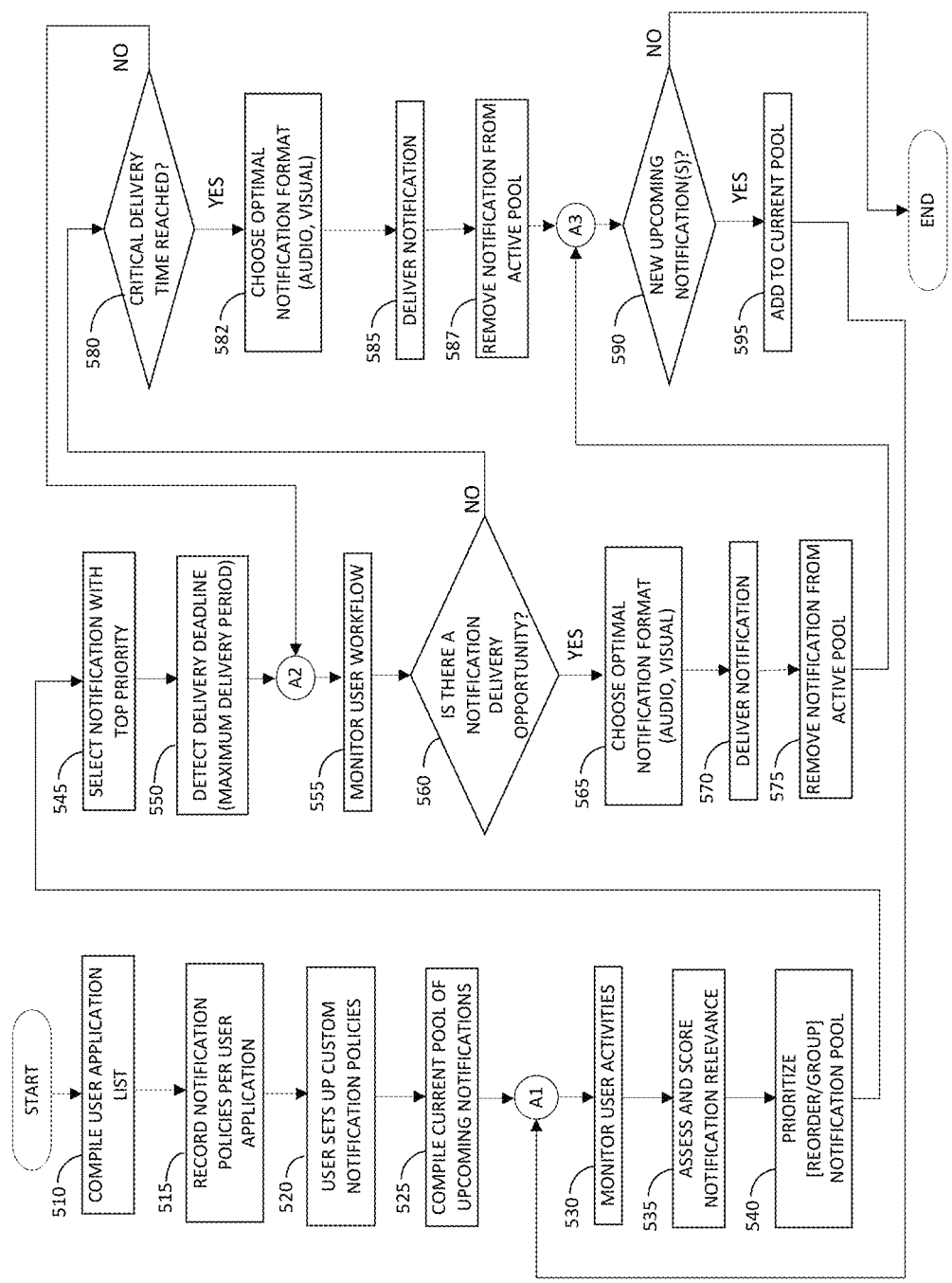
FIG. 5 is a system flow diagram illustrating system functioning in connection with prioritization and delivery of notifications, according to an embodiment of the system described herein.

Referring to FIG. 5, a system flow diagram 500 illustrates system functioning in connection with prioritization and delivery of notifications. Processing begins at a step 510, where the system compiles a user application list. After the step 510, processing proceeds to a step 515, where notification policies for each user application are recorded (or possibly extracted from a system database or other repository). After the step 515, processing proceeds to a step 520, where the user sets up custom notification policies (if any; see also FIG. 2). After the step 520, processing proceeds to a test step 525, where the system compiles a current pool of upcoming notifications generated by user applications, as explained elsewhere herein (see FIGS. 1, 3 and the accompanying text for descriptions and examples). After the step 525, processing proceeds to a step 530, where the system monitors user activities (see FIGS. 1, 4 for classification and examples). After the step 530, processing proceeds to a step 535, where the system assesses and scores notification relevance to the current user workflow. After the step 535, processing proceeds to a step 540, where the notification pool is grouped and prioritized, as explained elsewhere herein (see FIG. 3 and the accompanying text).

After the step 540, processing proceeds to a step 545, where a top priority notification is selected. After the step 545, processing proceeds to a step 550, where the system determines a delivery deadline (maximum length of the delivery period). After the step 550, processing proceeds to a step 555, where the system monitors user workflow, as explained elsewhere herein (see, in particular, FIG. 4 and the accompanying text). After the step 555, processing proceeds to a test step 560, where it is determined whether there is a notification delivery opportunity. If so, processing proceeds to a step 565, where an optimal notification format is chosen, such as visual, audio or both. After the step 565, processing proceeds to a step 570, where the notification is delivered. After the step 570, processing proceeds to a step 575, where the notification is removed from the active pool. After the step 575, processing proceeds to a test step 590, where it is determined whether there are new incoming notifications. If not, processing is complete; otherwise, processing proceeds to a step 595, where the new incoming notifications are added to the current notifications pool. After the step 595, processing proceeds back to the step 530, described above, which may be independently reached from the step 525.

If it was determined at the test step 560 that there is no notification delivery opportunity, processing proceeds to a test step 580, where it is determined whether a critical notification delivery time has been reached. If not, processing proceeds to the step 555, described above, which may be independently reached from the step 550. Otherwise, processing proceeds to a step 582 where an optimal notification format is chosen. After the step 582, processing proceeds to a step 585, where the notification is delivered. After the step 585, processing proceeds to a step 587, where the notification is removed from the active pool. After the step 587, processing proceeds to the test step 590, described above, which may be independently reached from the step 575.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations may vary from the illustrations presented herein. Further, various aspects of the system described herein may be deployed on various devices, including, but not limited to wearable devices, smartphones, tablets and other mobile computers. Mobile devices may use operating system(s) selected from the group consisting of: iOS, Android OS, Windows Phone OS, Blackberry OS and mobile versions of Linux OS. Certain components of the system may be cloud based and interact with mobile computers.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing push notifications for a user, comprising:
   buffering a plurality of notifications by placing the notifications in a queue, wherein the notifications are initially ordered by notification generation timestamps;
   sorting the notifications in the queue based on relevance of the notifications to the user and workflow of the user;
   determining an opportune time for the notifications for delivery based on position of the notifications in the queue and time sensitivity of the notifications;
   determining an opportune delivery format for the notifications based on at least one of: workflow, activities and an emotional state of the user;
   reordering the notifications in the queue according to the opportune time and the opportune delivery format of the notifications; and
   delivering the notifications to the user in an order corresponding to reordering the notifications that is different from the notification generation timestamps.

2. A method, according to claim 1, wherein the notifications are delivered from the queue following reordering.

3. A method, according to claim 1, wherein sorting includes classifying the notifications into categories that include user notifications, transactional notifications, promotional notifications, and system notifications.

4. A method, according to claim 1, wherein sorting includes associating each of the notifications with aspects of the workflow of the user.

5. A method, according to claim 1, wherein sorting includes scoring notifications according to notification relevance factors and prioritizing the notifications according to an aggregate relevance score of each of the notifications.

6. A method, according to claim 5, wherein the notification relevance factors depend on at least one of: notification properties, activities of the user, user settings, a physiological and emotional state of the user, and user interaction with content.

7. A method, according to claim 6, wherein the notification properties include at least one of: expiring, non-expiring, recurrence, non-recurrence, audio delivery format, and visual delivery format.

8. A method, according to claim 7, wherein the visual delivery format includes at least one of: plain text, images, emojis, interactive buttons, special effects, and display properties.

9. A method, according to claim 6, wherein the activities of the user include desktop work, a meeting and a phone talk.

10. A method, according to claim 6, wherein the user settings include settings for generation of notification previews and visibility of notifications on a lock screen of a user.

11. A method, according to claim 6, wherein the user interaction with content includes at least one of: visual interaction, voice interaction, touch interaction, gesture interaction, writing on paper, tablet or whiteboard, and eye-tracking.

12. A method, according to claim 1, further comprising: grouping notifications according to relevance.

13. A method, according to claim 12, wherein notifications that are grouped together are all delivered when at least one of the notifications that is grouped reaches a critical time.

14. A method, according to claim 1, wherein a notification that has reached a critical time is delivered independent of whether an opportune time has been reached.

15. A method, according to claim 1, wherein the opportune time depends on at least one of: time sensitivity of the notifications, the workflow of the user, activities of the user and an emotional state of the user.

16. A method, according to claim 15, wherein the emotional state of the user is determined by wearable sensors.

17. A method, according to claim 1, wherein the opportune time includes at least one of: a time when the user looks away from a screen or a time when participants of a meeting that include the user stop talking.

18. A method, according to claim 17, wherein the notifications are delivered through an audio device when the user looks away from the screen and the notifications are delivered through at least one of: an audio device and a visual device when participants of the meeting stop talking.

19. A method, according to claim 1, wherein sorting includes using cues to determine notifications to be sent to the user.

20. A method, according to claim 19, wherein the cues include at least one of: text of one of the notifications corresponding to text in the workflow of the user, one of the notifications being about an upcoming meeting that the user plans to attend, or one of the notifications being about a person that is currently engaging with the user.

21. A method, according to claim 1, wherein the notifications are from applications that include at least one of: a news application, a calendar application, a voicemail application, an email application, and a social application.

22. A method, according to claim 1, wherein at least one of the notifications is delivered to the user and to other users at a same time.

23. A non-transitory computer readable medium that contains software that manages push notifications for a user, the software comprising:
   executable code that buffers a plurality of notifications by placing the notifications in a queue, wherein the notifications are initially ordered by notification generation timestamps;
   executable code that sorts the notifications in the queue based on relevance of the notifications to the user and workflow of the user;
   executable code that determines an opportune time for the notifications for delivery based on position of the notifications in the queue and time sensitivity of the notifications;
   executable code that determines an opportune delivery format for the notifications based on at least one of: workflow, activities and an emotional state of the user;
   executable code that reorders the notifications in the queue according to the opportune time and the opportune delivery format of the notifications; and
   executable code that delivers the notifications to the user in an order corresponding to reordering the notifications that is different from the notification generation timestamps.

24. A non-transitory computer readable medium, according to claim 23, wherein a notification that has reached a critical time is delivered independent of whether an opportune time has been reached.

25. A non-transitory computer readable medium, according to claim 23, wherein the opportune time depends on at least one of: time sensitivity of the notifications, the workflow of the user, activities of the user and an emotional state of the user.

* * * * *